United States Patent [19]

Masters

[11] 4,284,180
[45] Aug. 18, 1981

[54] PORTABLE REEL FOR POWER LINES

[76] Inventor: Joseph Masters, 21124 Alexander, St. Clair Shores, Mich. 48081

[21] Appl. No.: 113,675

[22] Filed: Jan. 21, 1980

[51] Int. Cl.³ .......................................... H02G 11/00
[52] U.S. Cl. ................. 191/12.2 R; 242/96; 339/5 RL; 339/119 C
[58] Field of Search ............... 191/12.2 R, 12.2 A, 191/12.4; 339/5 RL, 6 RL, 8 RL, 119 C; 242/96

[56] References Cited

U.S. PATENT DOCUMENTS 2,972,667  2/1961  Ryder ..................... 191/12.2 R X
3,876,045  4/1975  Knarreborg ............... 191/12.2 R

FOREIGN PATENT DOCUMENTS 1765069  7/1971  Fed. Rep. of Germany ....... 339/6 RL

Primary Examiner—Richard A. Schacher
Attorney, Agent, or Firm—Scrivener, Clarke, Scrivener and Johnson

[57] ABSTRACT

The disclosure is of a portable device for use in energizing an electrically operated tool or the like from a remote electrical outlet, having a fixed support on which a short electric cord is wound, and a rotatable reel on which a long electric cord is wound and from which it may be unwound.

1 Claim, 5 Drawing Figures

PORTABLE REEL FOR POWER LINES

SUMMARY OF THE INVENTION

The portable power line device provided by the invention comprises a rotatable reel mounted on a rotatable shaft at its one end on the frame of a portable device and at its other end on a fixed shaft which is also mounted on the frame, a crank being provided to rotate the reel. The fixed shaft carries slip rings which are connected to a short electric cord wound on the device, and the rotatable reel carries brushes which engage the slip rings and are connected to a long electrical cord which is wound on the reel.

DESCRIPTION OF THE INVENTION

Figure 1:
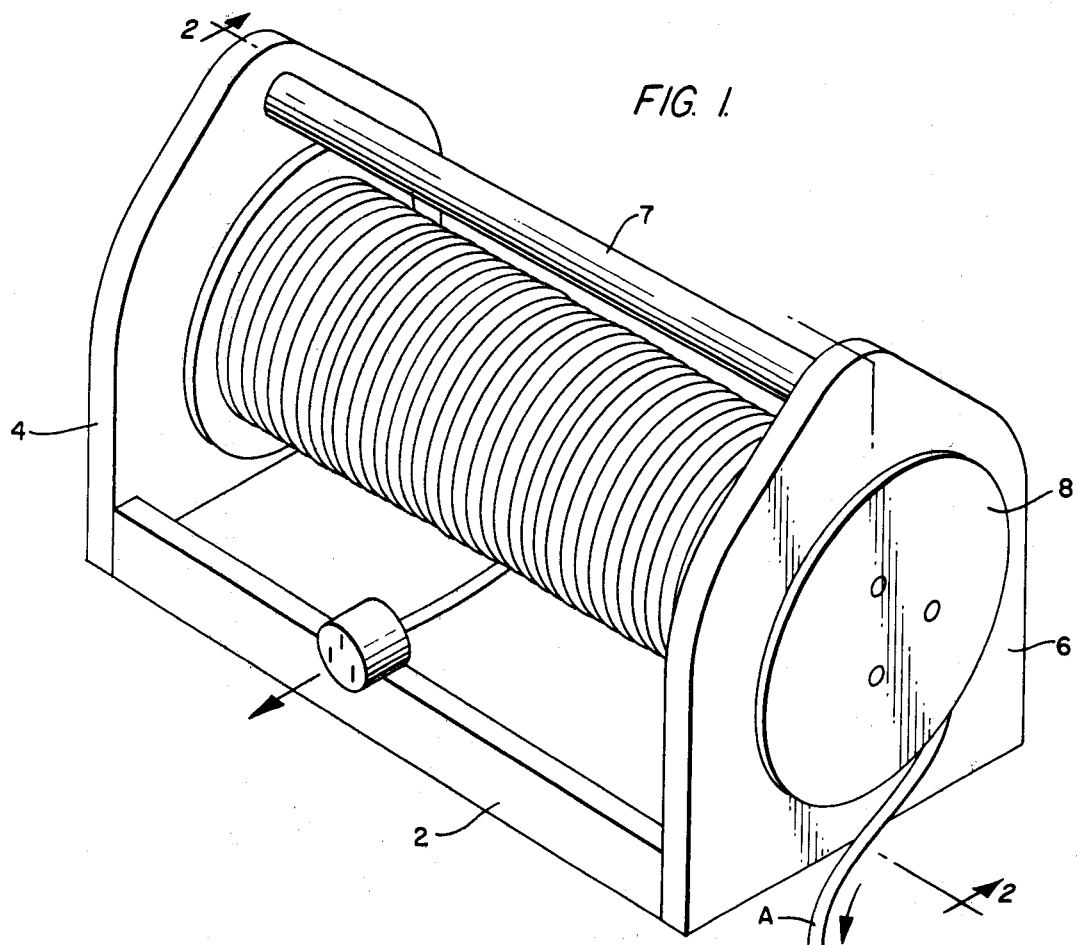
FIG. 1 is a perspective view of the portable reel provided by the invention.
Figure 2:
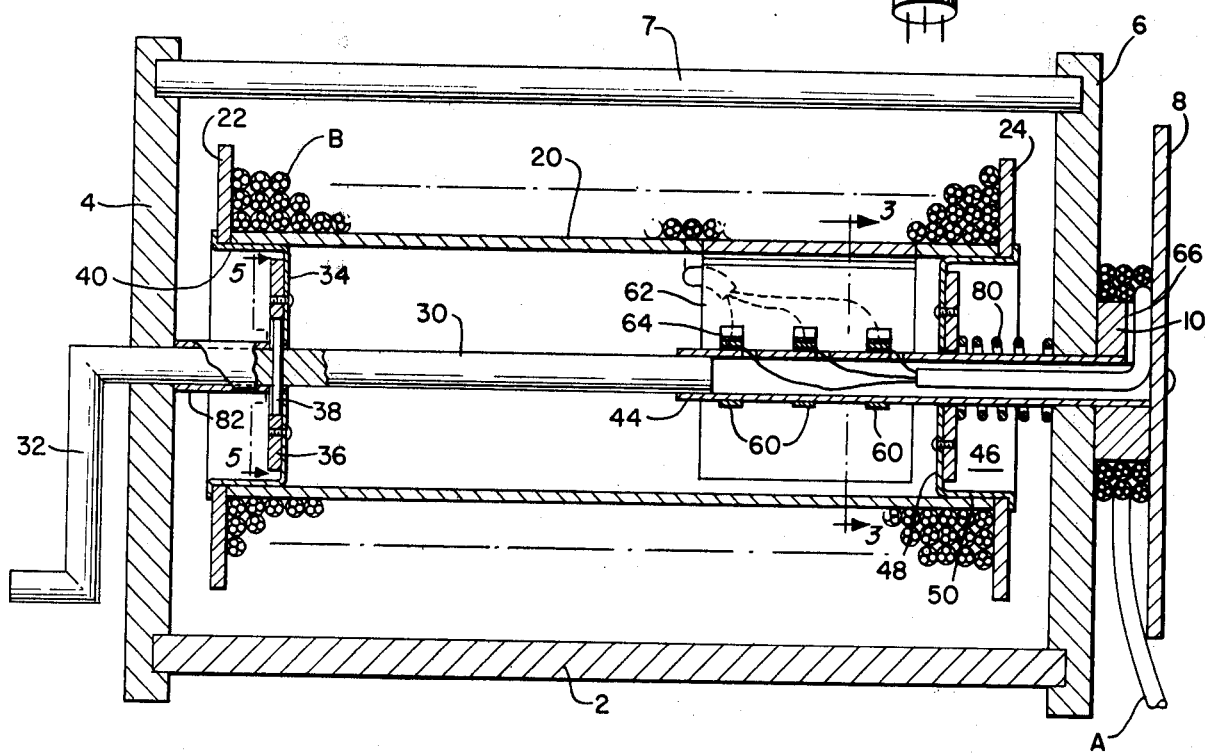
FIG. 2 is a longitudinal sectional view taken on line 2—2 of FIG. 1.
Figure 3:
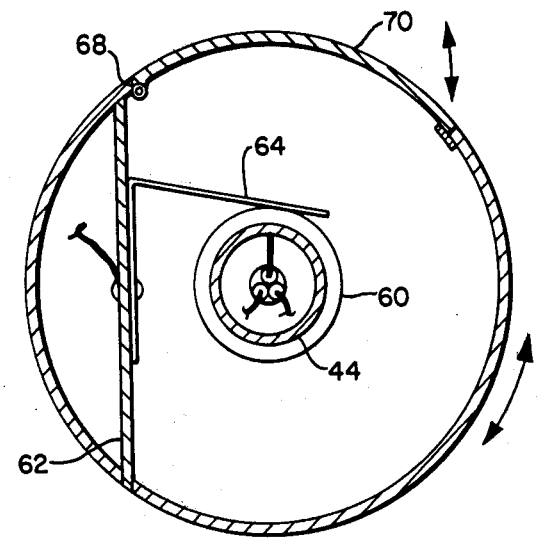
FIG. 3 is a sectional view taken on line 3—3 of FIG. 2.
Figure 4:
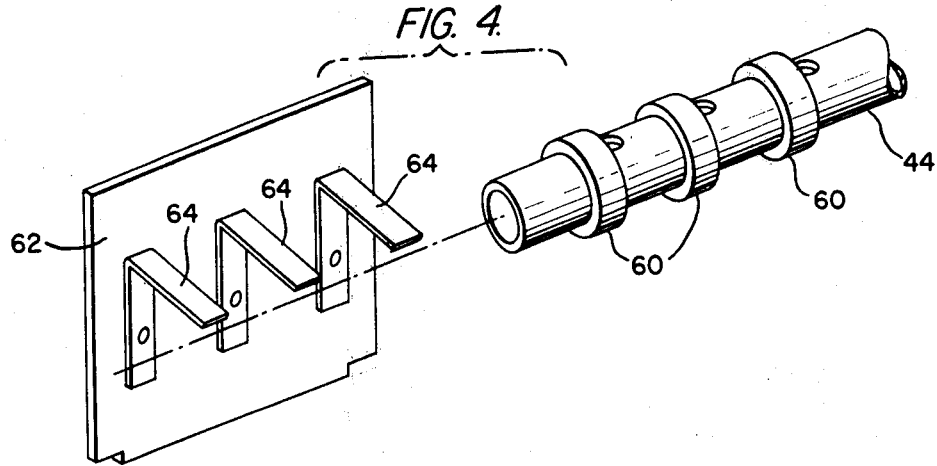
FIG. 4 is an exploded perspective view of the brush and slip-ring assembly.
Figure 5:
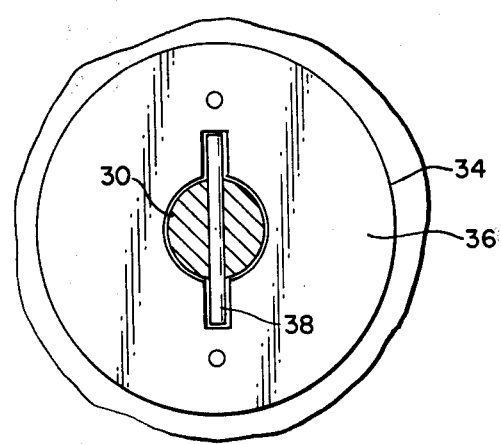
FIG. 5 is a sectional view taken on line 5—5 of FIG. 3.

The preferred form of the invention disclosed in this specification comprises a portable U-shaped supporting frame having a base 2, end walls 4, 6 which extend upwardly from the ends of the base, and a horizontal handle 7 which extends between the upper parts of the end walls and provides means for carrying the device. At one end of the frame there is provided means for supporting in wound relation a short electrical cord A having a length of the order of 8 feet. This supporting means comprising a circular plate 8 which is supported in spaced parallel relation to the end wall 6 by a cylindrical spacer 10 which is of such axial width that sufficient space is provided between end wall 6 and plate 8 to accomodate the wound cord A.

Between end walls 4, 6 and above the base 2 there is rotatably mounted a reel which comprises elongated cylindrical body portion 20 and end walls 22, 24, the end walls being of greater diameter than the body of the reel so that sufficient space will be provided on the outer surface of the body of the reel and between its end walls to accomodate a wound electrical cord B of desired length which may be of the order of 100 feet. This reel is rotatably mounted by being fixed to a rotatable shaft 30 which extends axially and centrally of the reel and at its one end extends through the side wall 4 of the frame and externally of the side wall is provided with a crank 32.

The reel 20, 22 is connected at its end adjacent the end wall 4 of the frame to the rotatable shaft 30 for rotation therewith. This connection is preferably accomplished by means of a cup-shaped member 34 which has a flat bottom 36 connected to the shaft 30 by pin 38 and also having an annular flange 40 which tightly and frictionally engages the inner annular surface of the reel adjacent its end.

At its other end of the frame there is provided a fixed shaft 44 which is connected to end wall 6 and extends from it inwardly of the frame and concentrically of the reel and which extends into the body of the reel a sufficient distance to support the reel and provide the functions which are to be described. This fixed shaft is hollow and of slightly greater internal diameter than the external diameter of the rotatable shaft 30, and the two shafts are of such length that the shaft 30 extends into the end of the shaft 44 and is rotatably journaled therein. The reel is rotatably mounted on the fixed shaft 44 at the end of the reel adjacent the end wall 6 of the frame, and this mounting is accomplished by means of a cup-shaped member 46 which has a flat bottom 48 surrounding but not connected to the shaft 44 and also having an annular flange 50 which tightly and frictionally engages the inner annular surface of the reel 20 adjacent its end, and serves to maintain the reel in proper position on the fixed shaft 44.

Means are provided by the invention for supplying energy from a fixed source, such as a wall outlet, to the long electrical cord B which is wound on the reel. Such means comprise, first, a plurality, preferably three, annular slip rings 60 which are mounted in axially spaced relation on the outside of the fixed shaft 44. Within the reel there is mounted in adjacent relation to the slip rings a flat plate 62 which extends as a chord across the interior of the reel and which has mounted on it a plurality, three in this case, of brushes 64 which each of which is in resilient engagement with one of the slip rings.

In the embodiment of the invention being described the short cord A which is wound on the fixed support 8, 10 will have within it three electrical conductors, each of which will be connected through an opening 66 in spacer 10 and through the hollow shaft 44 to one of the fixed slip rings 60. The peripheral surface of the reel at the area thereof adjacent the plate 62 and brushes 64 is provided with an opening 68 having a closure member 70 which may be snapped into place and therefore easily removed and replaced. The long cord B which is wound on the reel will have three electrical conductors and the inner end of this cord will be led from the exterior to the interior of the reel through the opening 68 and the three conductors of this cord connected to the three brushes 64, respectively.

A spring 80 surrounds the fixed shaft 44 and bears at its one end on the end wall 6 of the frame and at its outer end bears on the bottom 48 of the member 46 by which the end of the reel is rotatably mounted on shaft 44. A spacer 82 surrounds the rotatable shaft 30 between the bottom wall 36 of the connecting member 34 and the end wall 4 of the frame and the function of spring 80 is to constantly urge the entire reel assembly against the spacer 82 thereby holding in one position and maintaining the brushes 64 in alignment and engagement with the slip ring.

It will be apparent and understood that in the use of the device provided by the invention the end of the short cord A may be unwound from the fixed support 8, 10 and its outer end connected to an outlet for electrical energy. The entire portable reel may then be left adjacent the electrical outlet and the long cord B pulled from the portable device and unwound from the reel and taken to the location of any device, tool or machine which is to be operated, at which point the suitable fitting on the outer end of the long cord is electrically connected to the device to be operated. When completed, the short cord A is disconnected and the rewound on the support 8, 10, after which the crank 32 is operated to rotate the reel to thereby re-wind the long cord B on the reel.

I claim:

1. A portable device for storing a short electrical cord and a longer electrical cord, which is constructed and operable to have one or the other of the cords connected to a fixed source of electrical energy and the other to be connected to a remote device requiring electrical energization, the device comprising a frame having a base, spaced end walls extending upwardly from the base, and a handle connecting the upper parts of the end walls, a fixed hollow shaft extending from a first one of the end walls of the frame toward the second end wall, a rotatable shaft extending from the second end wall toward the first end wall with its end adjacent the first end wall being rotatably journaled in the interior of the fixed hollow shaft, a crank connected to the end of the rotatable shaft externally of the second end wall, a fixed cylindrical support mounted on the external side of the first end wall, a cylindrical reel surrounding and concentric with the two shafts and overlapping both shafts, the reel being connected at its one end to the rotatable shaft and at its other end being rotatably mounted on the fixed shaft, a plurality of annular slip rings mounted in spaced axial relation on the fixed shaft, a plurality of brushes mounted on the reel internally thereof and having parts in sliding engagement with the slip rings, a short electrical cord mounted in wound relation on the fixed support, and having within it a plurality of electrical conductors each of which is connected through the hollow shaft to one of the slip rings, and a longer cord wound on the reel and also having within it a plurality of electrical conductors each of which is connected through the reel to one of the brushes.

* * * * *